Feb. 7, 1950  N. F. ANDREWS ET AL  2,496,514
CORN HARVESTER GATHERER CONSTRUCTION
Original Filed May 23, 1941  2 Sheets-Sheet 2
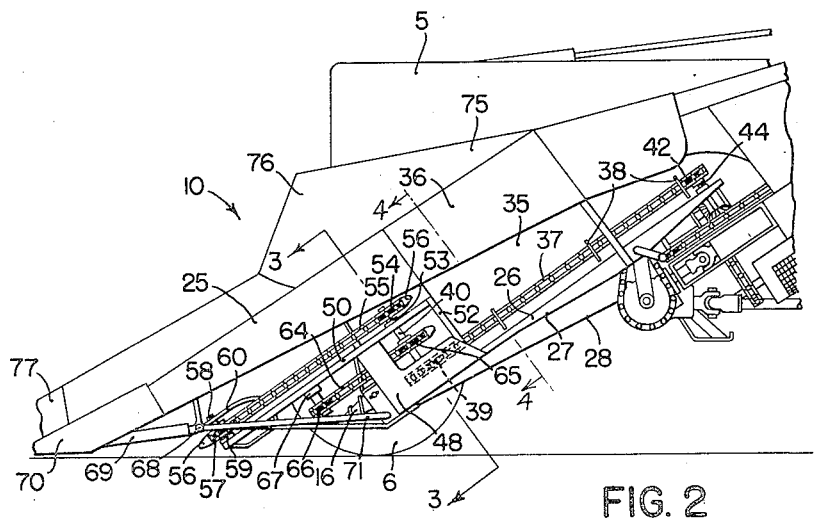
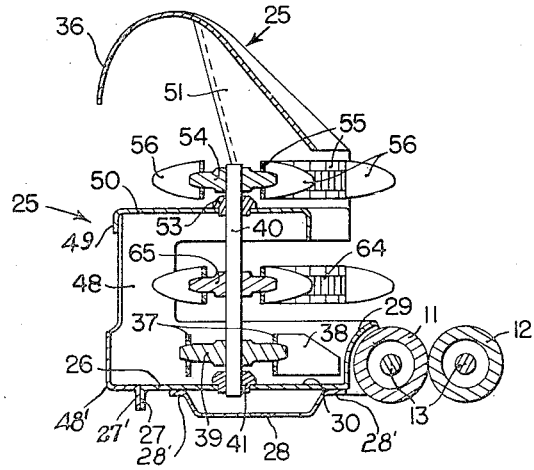
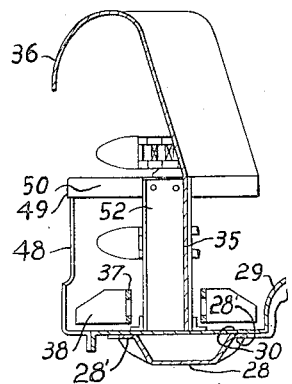
INVENTORS
NORMAN F. ANDREWS
RUSSELL L. DORT
ATTORNEYS Patented Feb. 7, 1950

2,496,514

UNITED STATES PATENT OFFICE 2,496,514

CORN HARVESTER GATHERER CONSTRUCTION

Norman F. Andrews, Moline, Ill., and Russell L. Dort, Davenport, Iowa, assignors to Deere & Company, Moline, Ill., a corporation of Illinois Original application May 23, 1941, Serial No. 394,806. Divided and this application March 10, 1944, Serial No. 525,885

12 Claims. (Cl. 56—119)

The present invention relates generally to corn harvesters and has for its principal object the provision of a corn harvester that is considerably lighter in weight and less expensive to manufacture, but is rugged, strong and durable. More specifically, it is an object of this invention to provide a gatherer fabricated entirely of sheet metal construction, without the use of relatively heavy structural beams, but without sacrifice in strength or rigidity.

These and other objects and advantages of the present invention will be apparent to those skilled in the art after a consideration of the following description, in which reference is had to the drawings appended hereto, in which Figure 1 is a plan view of a two-row tractor mounted corn harvesting implement, embodying the principles of the present invention, the hood of the left-hand gatherer unit being removed to show the gathering and conveying mechanism therebeneath.

Figure 2 is a side elevational view of the front end of the tractor and implement.

Figure 3 is an enlarged sectional elevational view taken through one of the outer gatherer units and the associated pair of snapping rolls along a line 3—3 in Figure 2.

Figure 4 is a similar sectional elevational view taken along a line 4—4 in Figure 2.

Figure 1:
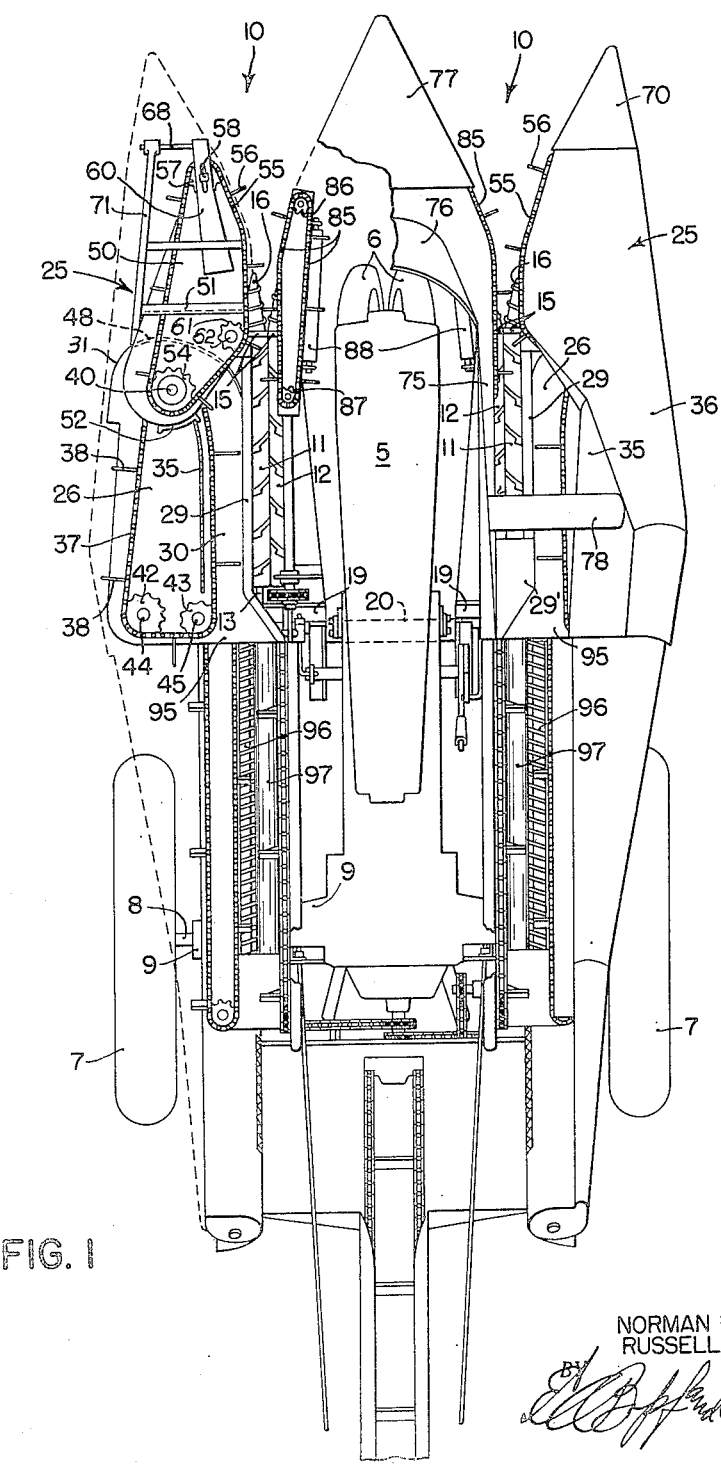

Referring now to the drawings, the tractor comprises a narrow longitudinally extending body 5 supported on a pair of closely spaced dirigible front wheels 6 and a pair of comparatively widely spaced rear traction wheels 7, the latter being fixed to a pair of laterally extending axles 8, which are journaled in the usual axle housing 9 forming an integral part of the tractor body.

The corn harvesting implement attachment includes a pair of picking or snapping units 10 disposed on opposite sides of the tractor body 5 adjacent the forward end thereof. Each picking unit 10 comprises a pair of cooperative snapping rolls 11, 12 mounted on shafts 13, which are supported on the frame at their lower ends in conventional bearings 15 fitted between the tapered point 16 of each roll and the cylindrical body thereof in the usual manner. The upper ends of the shafts 13 are journaled in suitable bearings mounted on the frame of the implement, which includes a pair of aligned transverse hollow beam of rectangular cross section 19, as described and claimed in U. S. Patent 2,347,871, of which this application is a division. The two picker units 10 are mounted on a common transverse supporting beam 20, on which the two transverse beams 19 are suitably supported.

With the exception of the main supporting beam 20 and the individual transverse frame members 19 of the two opposite picker units 10, the frame structure of each of the picker units is constructed almost entirely of sheet metal sections to reduce the weight and to save expense. Each of the outer gatherers 25 includes a forwardly and downwardly inclined lower sheet 26 having a downwardly turned outer edge flange 27, the sheet 26 being supported adjacent its rear end on the transverse beam 19. Rigidly attached beneath the sheet 26 and extending forwardly from the cross beam 19 is a trough shaped sheet metal reenforcing member 28, which is relatively deep at its rear end and tapers to a shallow section near the forward end of the sheet 26, thus providing a beam of tubular or box section for supporting the outer snapping roll. The trough member 28 is provided with outwardly extending flanges 28', fixed, as by welding, to the bottom of the lower plate 26. This is appreciably lighter, yet stronger than conventional structural frame members. The inner longitudinal edge of the sheet 26 is provided with an upwardly and inwardly directed flange 29, which extends alongside the outer snapping roll 11 and curves about the axis of the latter, defining a conveyor trough 30 for receiving the ears of corn separated from the stalks by the snapping rolls 11 and 12. The opposite side of the conveyor trough is defined by a generally vertically disposed longitudinally extending sheet metal wall 35 which rises upwardly and outwardly and is curved over the top, as at 36, to serve as a guide for the cornstalks.

The conveyor comprising an endless chain 37 and spaced paddles 38 attached thereto, is trained around a sprocket 39 which is fixed to a shaft 40 journaled at its lower end in a bearing 41 in the sheet 26 adjacent the forward end of the latter. The inner flight of the chain 37 moves the paddles 38 upwardly and rearwardly in the conveyor trough 30 adjacent the snapping rolls 11 and thus moves the ears of corn away from the snapping rolls toward the rear of the implement. At its upper end, the conveyor chain 37 passes around a pair of sprockets 42, 43 mounted on shafts 44, 45, respectively, which are supported in the sheet 26 in suitable journal bearings. The outer flight of the conveyor chain 37 passes forwardly along the outer edge of the sheet 26 to the sprocket 39 at the forward end. The forward end 31 of the sheet 26 is curved to conform approximately with the path of the outer end of the paddles 38 and is provided with a sheet metal bracing wall 48, which is curved in conformity with the rounded front end of the sheet 26 and rises substantially perpendicular thereto and serves the purpose of catching any ears of corn that tend to fall forwardly in the path of the conveyor paddles 38 before they are engaged by one of the paddles. The wall 48 also serves as a part of the sheet metal frame of the gatherer. The lower portion of the wall 48 is turned inwardly at 48' in the plane of the sheet 26, the inner edge of the portion 48' being formed with a depending flange 27' fixed by welding or the like to the flange 27.

Spaced above the sheet 26 is a second sheet 50, disposed in a substantially parallel plane with the plane of the sheet 26, overlapping the forward end of the latter and extending forwardly therefrom. The sheet 50 is fixedly attached to the upper edge of the wall 48 and also is fixed to the side wall 35 of the gatherer. It is provided with a depending integral peripheral flange 49. A transversely extending sheet metal brace 51 extends between the top of the sheet 50 and the under side of the curved portion 36 of the gatherer. A channel-shaped sheet metal brace 52 is connected between the upper and lower sheets 50, 26 at the rounded rear end of the upper sheet 50. To this brace 52, is also connected the forward end of the side wall 35 of the conveyor trough.

The shaft 40 on which is fixed the sprocket 39 at the forward end of the elevator chain 37, extends generally perpendicular to the lower sheet 26 upwardly therefrom, through an aligned aperture in the upper sheet 50, and is supported in a bearing 53 fixed to the upper sheet 50. The shaft 40 is extended above the bearing 53 and supports at its upper end a sprocket 54, around which is trained a gatherer chain 55 having outwardly projecting lugs 56 for engaging the stalks of corn to gather the latter into the snapping rolls 11. The gatherer chain 55 extends forwardly along the outer edge of the sheet 50 from the sprocket 54, and passes around a lower sprocket 57, which is mounted on a shaft 58 journaled in a lower bearing 59 fixed at the forward end of the sheet 50, and in an upper bearing on an arm 60, mounted at its rear end in the center of the sheet 50 and extending forwardly therefrom above the sprocket 57 at the forward end of the sheet 50. The chain 55 extends rearwardly alongside the row of corn being harvested and over a guide sprocket 61 journaled on a stub shaft 62 mounted on the upper sheet 50. A second gatherer chain 64 is trained around a sprocket 65, which is fixed to the shaft 40 intermediate of the sheets 26, 50 and around a forward sprocket 66, which is journaled in a bearing 67 mounted beneath the upper sheet 50.

The forward end of the arm 60 is also provided with a transversely extending frame member 68, to which is pivotally connected a supporting arm 69, to which is attached a floating gatherer point 70, which swings about the pivot point of the arm 69 on the frame member 68. A brace rod 71 extends rearwardly and outwardly from the frame member 68 and is fixed to the forward end of the lower sheet 26.

The inner gatherer comprises a pair of side walls 75 extending alongside the tractor on opposite sides thereof and converging forwardly of the tractor and interconnected by a rounded hood 76 extending around the front end of the tractor. A floating gatherer point 77 is supported on the forward ends of the converging walls 75 in any suitable manner, as is well-known to those skilled in the art. The inner side walls 75 are connected with the walls 35 on the opposite gatherer by means of a tubular sheet metal bracing member 78 extending over the ear conveyor and over the upper end of the snapping rolls 11, 12 on each side of the tractor.

A pair of inner gatherer chains 85 are trained around a pair of fore and aft spaced pulleys 86, 87 supported on the inner gatherer walls 75. Also supported on the inner gatherer walls 75 in fore and aft spaced journals are a pair of longitudinally extending rollers 88 at each side of the front wheels 6 of the tractor and are adapted to engage the latter if the wheels are turned too sharply in either direction, thus preventing damage to either the tires or the chains 85.

The upwardly extending flange 29 along the inner side of the lower sheet 26 is extended upwardly and inwardly across the upper ends of the snapping rolls 11, 12, as indicated at 29' and serves to cover the upper snapping roll bearings. The inner rear corner of the sheet 26 is curved downwardly and inwardly behind the inclined flange extension 29', as indicated at 95. This causes the ears of corn which are moved upwardly and rearwardly by the paddles 38, to slide inwardly toward the tractor body and away from the paddles at the upper end of the conveyor, as the ears drop onto the husking rolls 96, 97. At the same time that the ears slide inwardly, the paddles turn outwardly as the chain 37 moves around the sprocket 43, and by virtue of the second sprocket 42 disposed directly outwardly from the sprocket 43, the chain moves substantially at right angles away from the conveyor trough. This has been found to provide a better and more efficient disengagement of the paddles from the ears than a conveyor in which the chain turns approximately 180 degrees around the upper sprocket 43.

During operation, the tractor moves forwardly between a pair of adjacent rows of corn, each row being gathered between the center gatherer point 77 and one of the outer points 70. The stalks of corn are urged by the gatherer chains between the tapered points 16 of the snapping rolls 11, 12, which rotate in opposite directions to draw the cornstalks downwardly therebetween, snapping the ears from the stalks in a manner well-known to those skilled in the art. The ears of corn drop over the flange 29 into the conveyor trough 30 and are moved rearwardly therein by the paddles 38 on the conveyor chain 37, which discharge the ears over the rear end portion 95 of the conveyor trough to the husking rolls 96, 97. The details of the husking mechanism are not described herein, but reference may be had to our aforementioned patent for further description thereof.

While the foregoing description of one of the gatherer units refers particularly to the left-hand unit, it is to be understood that the gatherer on the right side of the implement is of similar construction but is a right-hand instead of a left-hand unit.

We claim:
1. In a corn picker, a gatherer comprising a pair of upper and lower metal sheets disposed in generally parallel spaced apart planes and hav- ing flanges turned on the edges thereof to provide rigidity, a sheet metal bracing wall disposed substantially perpendicular to said sheets and rigidly interconnecting the same, a sheet metal trough extending longitudinally beneath said lower sheet and rigidly fixed thereto, serving as a tubular supporting beam therefor, a shaft extending substantially perpendicular to said sheets and having a pair of supporting bearings attached to said sheets, respectively, a sprocket mounted on said shaft, and a conveyor chain engaging said sprocket.

2. In a corn picker, a gatherer comprising a pair of upper and lower metal sheets disposed in generally parallel spaced apart planes in overlapping arrangement, a sheet metal bracing wall curved around one end of one of said sheets and extending substantially perpendicular therefrom to the other of said sheets and rigidly attached to both of said sheets, a brace disposed at one end of the other of said sheets rigidly interconnecting the two sheets, and a generally vertical stalk guiding sheet fastened to each of said upper and lower sheets and curving laterally over said upper sheet.

3. In a corn picker, a gatherer comprising a pair of upper and lower metal sheets disposed in generally parallel spaced apart planes and having flanges turned on the edges thereof to provide rigidity, a sheet metal bracing wall disposed substantially perpendicular to said sheets and rigidly interconnecting the same, a sheet metal trough extending longitudinally beneath said lower sheet and having outwardly turned longitudinally extending flanges secured to the bottom of the latter, said trough serving as a tubular beam for supporting said gatherer, a shaft extending substantially perpendicular to said sheets and having a pair of supporting bearings attached to said sheets, respectively, a sprocket mounted on said shaft, a conveyor chain engaging said sprocket, and conveyor paddles attached to said chain in spaced relation and slidable over said lower sheet for moving harvested material thereon.

4. In a corn picker, a gatherer comprising a pair of upper and lower metal sheets disposed in generally parallel spaced apart planes in overlapping arrangement, a shaft extending substantially perpendicular to both sheets between the overlapping portions thereof, a sprocket mounted on said shaft above said lower sheet, a conveyor chain trained around said sprocket and having spaced paddles attached thereto for moving ears of corn upon said lower sheet, a sheet metal wall attached to the overlapped end of said lower sheet and extending upwardly therefrom and fixed to said upper sheet, and a sheet metal trough extending longitudinally beneath said lower sheet and rigidly fixed thereto, said trough being supported at its rear end and tapered forwardly to serve as a supporting beam for said gatherer.

5. In a corn picker, a gatherer comprising a pair of forwardly and downwardly inclined upper and lower sheets disposed in generally parallel spaced apart planes in overlapping arrangement, said upper sheet extending forwardly from the front end of said lower plate, a shaft extending substantially perpendicular to said lower sheet between the overlapping portions of said sheets, a sprocket mounted on said shaft above said lower sheet, a conveyor chain trained around said sprocket and extending rearwardly above said lower sheet and having spaced paddles attached thereto for moving ears of corn rearwardly upon said lower sheet, and a sheet metal bracing wall attached to the forward end of said lower sheet and extending upwardly therefrom and fixed to said upper sheet, said wall extending transversely across the lower sheet ahead of said sprocket to catch any ears that tend to slide forwardly off the end of the sheet.

6. In a corn picker having a pair of snapping rolls, a gatherer positioned alongside said rolls and comprising in combination a pair of forwardly and downwardly inclined upper and lower sheets disposed in generally parallel spaced apart planes in overlapping arrangement, said upper sheet extending forwardly from the front end of said lower sheet, a shaft extending substantially perpendicular to said lower sheet between the overlapping portions of said sheets, a sprocket mounted on said shaft above said lower sheet, a conveyor chain trained around said sprocket and extending rearwardly above said lower sheet and having spaced paddles attached thereto for moving ears of corn rearwardly upon said lower sheet, said lower sheet having an upwardly turned flange alongside one of said rolls to form a conveyor trough adapted to receive ears therefrom and within which said conveyor moves.

7. In a corn picker having a pair of snapping rolls, a gatherer positioned alongside said rolls and comprising in combination a pair of forwardly and downwardly inclined upper and lower sheets disposed in generally parallel spaced apart planes in overlapping arrangement, said upper sheet extending forwardly from the front end of said lower plate, a shaft extending substantially perpendicular to said lower sheet between the overlapping portions of said sheets, a sprocket mounted on said shaft above said lower sheet, a conveyor chain trained around said sprocket and extending rearwardly above said lower sheet and having spaced paddles attached thereto for moving ears of corn rearwardly upon said lower sheet, said lower sheet having an upwardly turned flange alongside one of said rolls to form a conveyor trough adapted to receive ears therefrom and within which said conveyor moves, and a sheet metal bracing wall attached to the forward end of said lower sheet and extending upwardly therefrom and fixed to said upper sheet, said wall extending transversely across the lower sheet ahead of said sprocket to catch any ears that tend to slide forwardly off the end of the sheet.

8. In a corn picker or the like, a gatherer comprising a pair of upper and lower metal sheets disposed in generally parallel planes and having flanges along the edges thereof to provide rigidity, bracing means interconnecting said sheets, and a sheet metal trough serving as a tubular beam, disposed longitudinally under said lower sheet and rigidly fixed thereto.

9. In a corn picker or the like, a gatherer comprising a pair of upper and lower metal sheets disposed in generally parallel planes and having flanges along the edges thereof to provide rigidity, a sheet metal bracing wall curved around one end of one of said sheets and extending substantially perpendicular therefrom to the other of said sheets and rigidly attached to both of said sheets, a brace disposed at one end of the other of said sheets rigidly interconnecting the two sheets, and a sheet metal trough serving as a longitudinally disposed tubular beam under said lower sheet and rigidly fixed thereto.

10. In a corn picker, a gatherer comprising a pair of forwardly and downwardly inclined upper and lower sheets disposed in generally parallel spaced apart planes in overlapping arrangement, said upper sheet extending forwardly from the front end of said lower plate, a shaft extending substantially perpendicular to said lower sheet between the overlapping portions of said sheets, a sprocket mounted on said shaft above said lower sheet, a conveyor chain trained around said sprocket and extending rearwardly above said lower sheet and having spaced paddles attached thereto for moving ears of corn rearwardly upon said lower sheet, a sheet metal bracing wall attached to the forward end of said lower sheet and extending upwardly therefrom and fixed to said upper sheet, said wall extending transversely across the lower sheet ahead of said sprocket to catch any ears that tend to slide forwardly off the end of the sheet, and a sheet metal trough serving as a longitudinally disposed tubular beam under said lower sheet and rigidly fixed thereto.

11. In a corn picker or the like, a gatherer comprising a pair of upper and lower metal sheets disposed in generally parallel planes and having flanges along the edges thereof to provide rigidity, bracing means interconnecting said sheets, and a sheet metal trough extending longitudinally beneath said lower sheet and having outwardly turned flanges secured to the bottom of the latter, said trough serving as a tubular beam for supporting said gatherer.

12. In a corn picker or the like, a gatherer comprising a pair of upper and lower metal sheets disposed in generally parallel planes and having flanges along the edges thereof to provide rigidity, bracing means interconnecting said sheets, and a sheet metal trough extending longitudinally beneath said lower sheet and having outwardly turned flanges secured to the bottom of the latter, said trough being supported at its rear end and tapering forwardly to provide a tubular beam for supporting said gatherer.

NORMAN F. ANDREWS.
RUSSELL L. DORT.

REFERENCES CITED

The following references are of record in the file of this patent:

UNITED STATES PATENTS

| Number | Name | Date |
|---|---|---|
| 749,298 | Johnston | Jan. 12, 1904 |
| 1,046,335 | Rust | Dec. 3, 1912 |
| 1,838,569 | Powell | Dec. 29, 1931 |
| 2,004,711 | Thieman | June 11, 1935 |
| 2,160,486 | Oehler et al. | May 30, 1939 |